US005549523A

United States Patent [19]

Doucet

[11] Patent Number: 5,549,523

[45] Date of Patent: Aug. 27, 1996

[54] GEAR REDUCER

[75] Inventor: Pierre Doucet, Grande-Ile, Canada

[73] Assignee: Equipement Precibec Inc., St. Laurent, Canada

[21] Appl. No.: 231,803

[22] Filed: Apr. 25, 1994

[51] Int. Cl.$^6$ .............................. F16H 3/44; B41F 13/24

[52] U.S. Cl. .......................... 475/298; 475/339; 475/347; 101/181; 101/248

[58] Field of Search .................................... 101/248, 181; 475/298, 338, 339, 347

[56] References Cited

U.S. PATENT DOCUMENTS

| | | | |
|---|---|---|---|
| 1,632,571 | 6/1927 | Watson | 475/339 X |
| 1,979,205 | 10/1934 | Payne | 101/248 |
| 2,539,068 | 1/1951 | Funk | 101/248 |
| 3,896,724 | 7/1975 | Muselik | 101/248 |
| 4,345,792 | 8/1982 | Shephard | 475/347 |

FOREIGN PATENT DOCUMENTS

| | | | |
|---|---|---|---|
| 2029715 | 5/1991 | Canada | 101/86 |
| 9420323 | 9/1994 | WIPO | 475/298 |

*Primary Examiner*—Charles A. Marmor
*Assistant Examiner*—Nathan O. Jensen
*Attorney, Agent, or Firm*—Mila Shvartsman

[57] ABSTRACT

A present invention relates to a gear reducer for printing machine or the like comprising a hand wheel adapted to provide rough and fine adjustment nodes. The hand wheel is mounted on a sleeve adapted to be engaged with a drive shaft of said printing machine. A planet wheel mounted on the hand wheel by means of a pin shaft extending parallel to the sleeve. A drive gear mounted on the sleeve, said drive gear adapted to turn together with the sleeve. A lock means is adapted to retain the hand wheel locked on the sleeve. A fixed gear is mounted on a frame of said press machine, the fixed gear being coaxial with said drive gear. The fixed gear has a number of teeth which differs from the number of teeth of the drive gear. The hand wheel is adapted to move together with the planet wheel gear axially forwardly towards said fixed gear. In the rough adjustment mode the hand wheel is being retained by the lock means engaged on the sleeve, the hand wheel being adapted to activate said drive shaft by means of the sleeve. In the fine adjustment mode the hand wheel is disengaged from the lock means by means of axial forward movement towards the fixed gear, and the planet wheel gear is simultaneously meshed with the drive gear and the fixed gear.

25 Claims, 7 Drawing Sheets

GEAR REDUCER

The present invention relates to a gear reducer and more particularly to a gear reducer for printing machines.

There is known U.S. Pat. No. 1,979,205 related to a printing machine comprising a box wheel a sleeve for said box wheel, a worm wheel on said sleeve, a worm meshing with said worm wheel and constituting the driving connection between said box wheel and said sleeve and also capable of being turned about the axis of its shaft only to effect angular adjustment of said box wheel and said sleeve relatively to one another.

There is also known U.S. Pat. No. 2,539,068 related to a cylinder adjusting mechanism for multicolor printing presses comprising a colour plate cylinder mounted on a frame, means for adjustably mounting said plate cylinder, a shaft for said plate cylinder, a bushing extending through said frame and rotatably adjustable therein, a beating eccentrically positioned in said bushing, a sleeve positioned around the end of said shaft and inside of said bearing.

There is also known a printing press adjustment means shown on FIG. 6 comprising a hand wheel which is connected to a drive shaft by means of a spring pin inserted in the drive shaft. In operation, the hand wheel drives the drive shaft directly to provide both rough and fine adjustment of the printing press. The greatest disadvantage of such attachment is the fact that in order to achieve a fine adjustment mode the operator may spend a substantial amount of time and rely only on his work expertise.

The present invention allows to eliminate this disadvantage and to provide the adjustment gear reducer which has a precision which substantially greater than on the known attachments and at the same time very inexpensive and easy to install on any printing presses, duplicators or any other devices requiting fine mechanical adjustment or speed reducing.

SUMMARY OF INVENTION

Broadly, the present invention relates to a gear reducer for printing machine or the like comprising:

a hand wheel adapted to provide rough and fine adjustment modes, said hand wheel being mounted on a sleeve adapted to be engaged with a drive shaft of said printing machine;

a planet wheel mounted on said hand wheel by means of a pin shaft extending parallel to said sleeve, a drive gear mounted on said sleeve, said drive gear adapted to turn together with said sleeve;

a lock means adapted to retain said hand wheel locked on said sleeve, a fixed gear mounted on a frame of said press machine, said fixed gear being coaxial with said drive gear, said fixed gear having a number of teeth which differs from the number of teeth of said drive gear;

said hand wheel is adapted to move together with said planet wheel gear axially forwardly towards said fixed gear;

wherein in said rough adjustment mode said hand wheel is being retained by said lock means engaged on said sleeve, said hand wheel is adapted to activate said drive shaft by means of said sleeve, and wherein in said fine adjustment mode said hand wheel being disengaged from said lock means by means of axial forward movement towards said fixed gear, and said planet wheel gear being simultaneously meshed with said drive gear and said fixed gear, said fine adjustment is provided by means of input of rotation movement transferred from said planet wheel gear meshed with said fixed gear, wherein the difference between the number of teeth of said drive gear and said fixed gear is at least one tooth. In one embodiment said fixed gear has one tooth more than said drive gear. In still another embodiment, said drive gear has one tooth more than said fixed gear. Said reducer having a neutral adjustment mode provided to facilitate a successful transfer of said hand wheel from said rough adjustment position into said fine adjustment position, wherein in said neutral position said hand wheel is moved axially forwardly towards said fixed gear and becomes completely disengaged from said lock means without activating said drive shaft.

Said reducer further comprising a bias means mounted on said sleeve, said bias means being provided to return said hand wheel from said fine adjustment mode into said rough adjustment mode. Said sleeve and said drive gear comprise a unitary element.

In yet another embodiment, the present invention relates to gear reducer adapted to provide fine mechanical adjustment or speed reducing in a gearbox or the like comprising in combination:

a hand wheel means adapted to provide rough and fine adjustment modes, said hand wheel means being mounted on a sleeve adapted to be engaged with a drive shall of said gearbox, a drive gear mounted on said sleeve and adapted to turn with said sleeve;

a planet wheel gear mounted on a pin shaft extending parallel to said sleeve, said hand wheel means and said planet wheel gear adapted to move axially;

a fixed gear mounted co-axially with said drive gear, said fixed gear being non-rotatably secured in its position to be fixed relative to said drive shaft, wherein the number of teeth of said fixed gear differs from the number of teeth of said drive gear;

wherein in said rough adjustment mode said drive shaft is activated by means of said hand wheel being fixedly retained in said sleeve, and wherein in said fine adjustment mode said drive shaft being activated by means of said planet wheel gear intermeshing simultaneously with said drive gear and said fixed gear.

In still another embodiment, the present invention relates to a printing press having a frame member and a drive shaft connected to an impression cylinders, a gear reducer comprising in combination:

a hand wheel adapted to provide rough and fine adjustment modes, said hand wheel being mounted on a sleeve adapted to be engaged with a drive shaft of said printing machine;

a planet wheel mounted on said hand wheel by means of a pin shaft extending parallel to said sleeve, a drive gear mounted on said sleeve, said drive gear adapted to turn together with said sleeve;

a lock means adapted to retain said hand wheel locked on said sleeve, a fixed gear mounted on a frame of said press machine, said fixed gear being coaxial with said drive gear, said fixed gear having a number of teeth which differs from the number of teeth of said drive gear;

said hand wheel is adapted to move together with said planet wheel gear axially forwardly towards said fixed gear;

wherein in said rough adjustment mode said hand wheel is being retained by said lock means engaged on said sleeve, said hand wheel is adapted to activate said drive shaft by means of said sleeve, and wherein in said fine adjustment mode said hand wheel being disengaged from said lock means by means of axial forward movement towards said fixed gear, and said planet wheel gear being simultaneously meshed with said drive gear and said fixed gear, said fine adjustment is provided by means of input of rotation movement transferred from said planet wheel gear meshed with said fixed gear.

BRIEF DESCRIPTION OF DRAWINGS

The invention is illustrated by way of a preferred embodiment with reference to the drawings, in which:

Referring now to FIGS. 1–3 the present invention comprises a gear reducer having a hand wheel 2 mounted on a sleeve 10 which is in turn is connected to a drive shaft 5 of a printing press to provide rough and fine adjustment modes of operation. A satellite gear 7 is mounted on hand wheel 2 by means of a pin shaft 3 which is extending parallel to a sleeve 10 and is provided to support and involve the planet wheel gear 7. Clip 23 allows to keep said planet wheel gear 7 in its place. Thus hand wheel 2 is provided to support and turn the planet gear 7 around a drive gear 12 mounted on the sleeve 10 and is adapted to turn together with said sleeve 10. Preferably, but not necessarily sleeve 10 and drive gear 12 comprise an integral element adapted to fulfil a function of supporting all parts and transfer movement to the drive shaft 5 of the press. A fixed gear 14 is mounted co-axially with drive gear 12 and is non-rotatably fixed to a cover 15 which in turn is connected to a torsion bar or fork plate 16 connected by means of set of screws 18 and washer lock 17 together with clip 24 to a frame of a press duplicator, wherein said clip 24 keeps the assembly of fork plate 16, fixed gear 14 and cover 15 in place on the sleeve 10. In this case fixed gear 14 is operated as a reference guide for planet wheel gear 7 which in a fine adjustment mode is provided to involve sleeve 10. The fork plate 16 is provided to support cover 15 and fixed gear 14 and also to restrain movements of fixed gear 14. The attachment further comprises a lock means adapted to hold hand wheel 2 in place with the sleeve 10 in the rough adjustment position. Said lock means includes a crown 1 and lock 20 mounted by means of screws 11 and 21 respectively.

Figure 1:
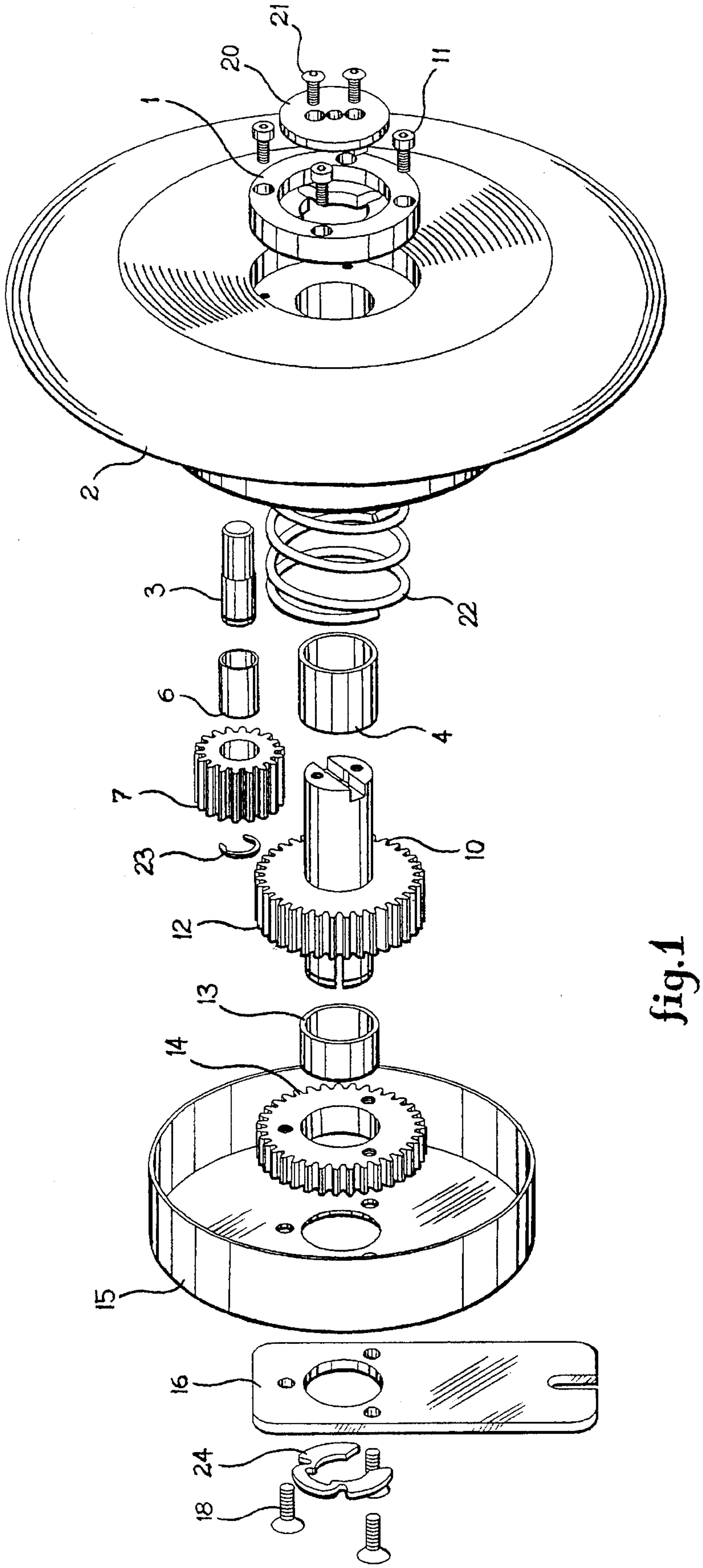
FIG. 1 shows a perspective view of the present invention in dis-assembled form.
Figure 2:
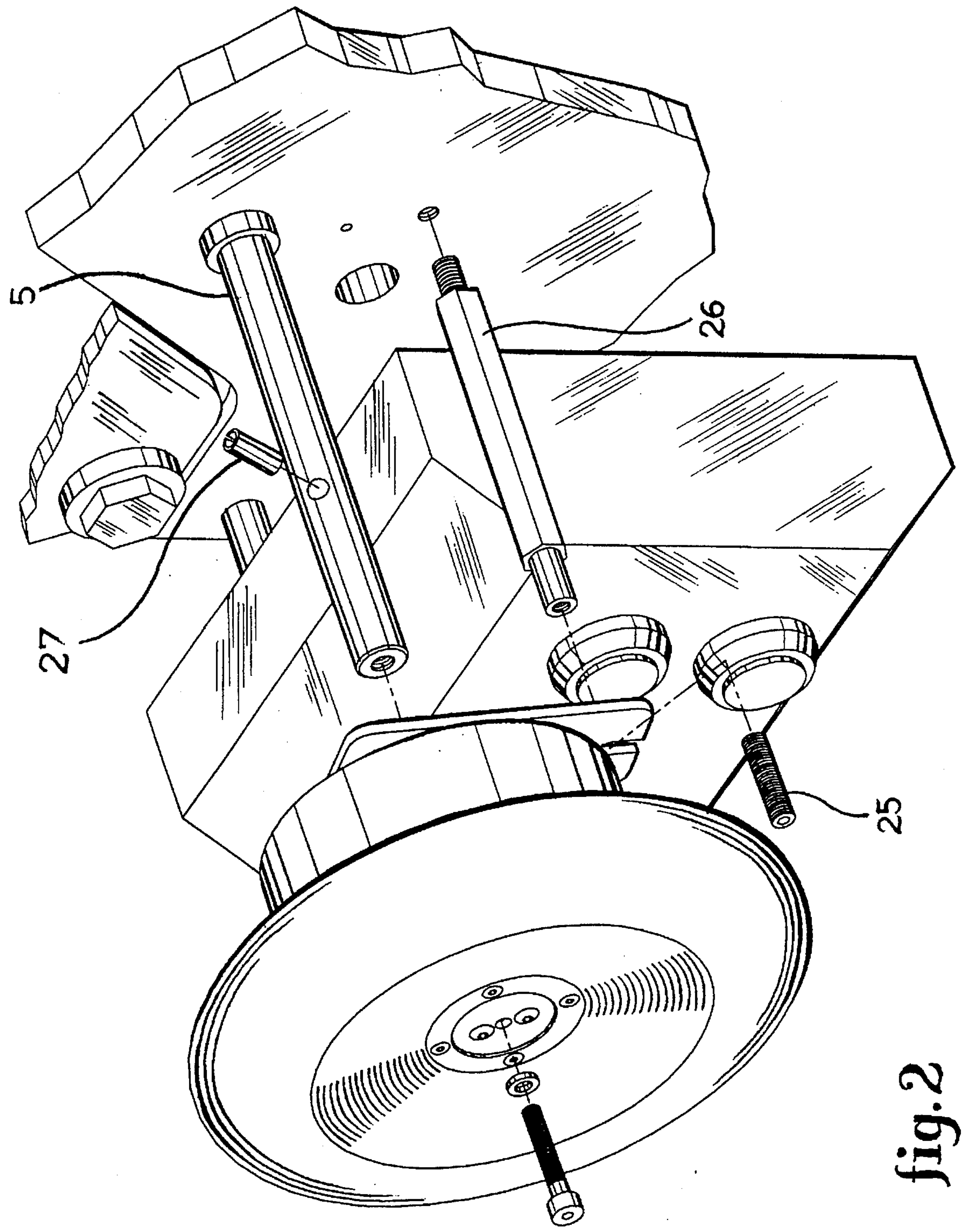
FIG. 2 shows a perspective view of the present invention attached to a printing machine depicting a fragment of the frame.
Figure 7:
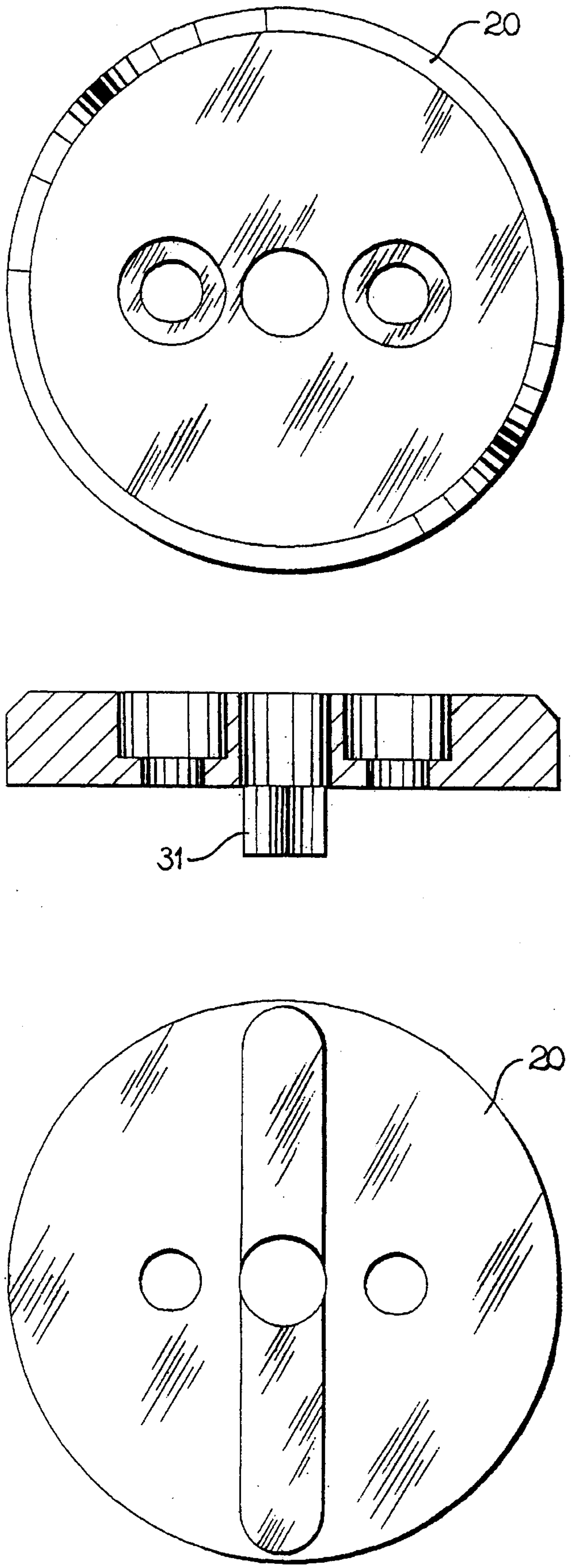
FIG. 7 shows a lock means according to the present invention.
Figure 8:
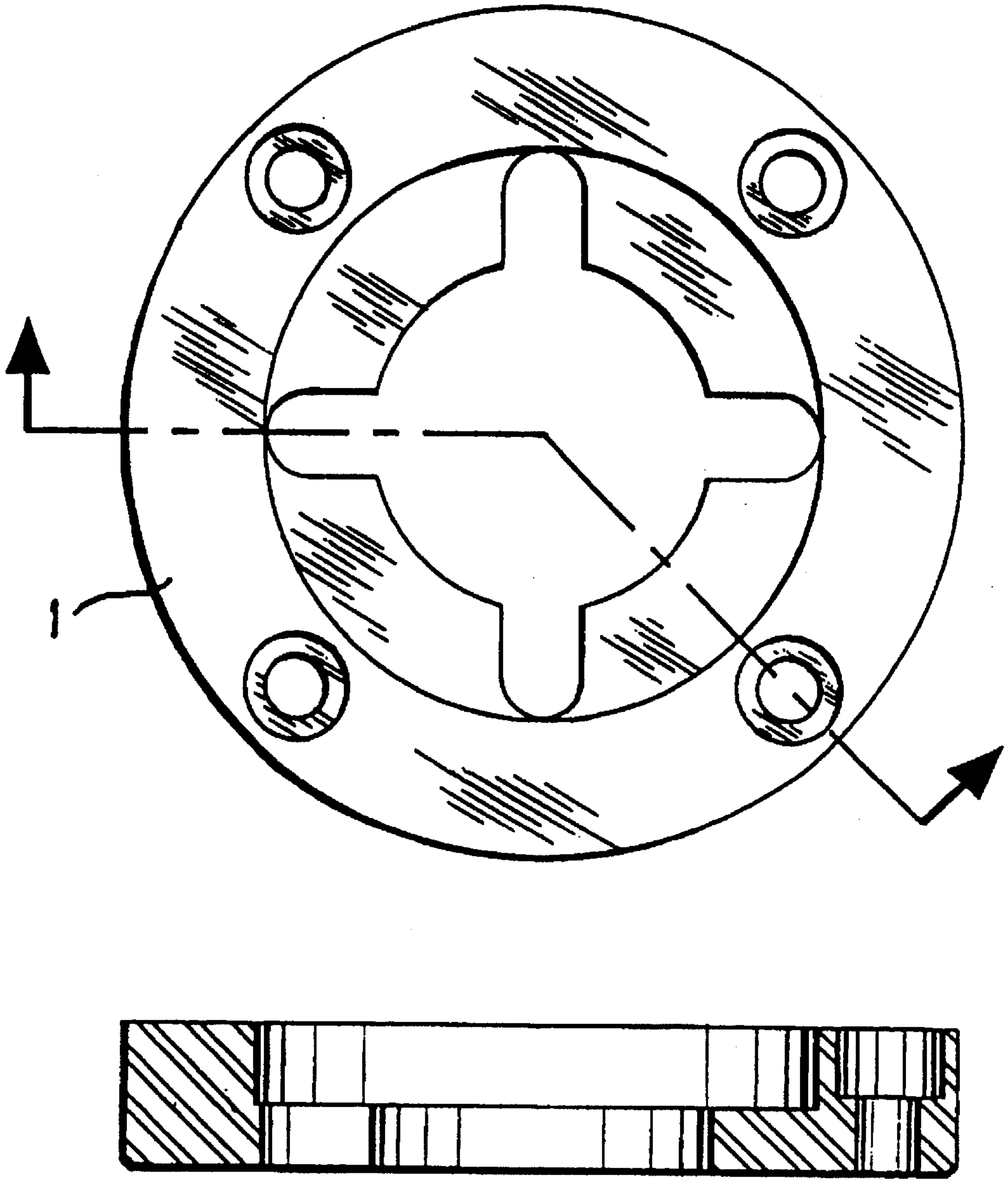
FIG. 8 shows a crown according to the present invention.
Figure 9:
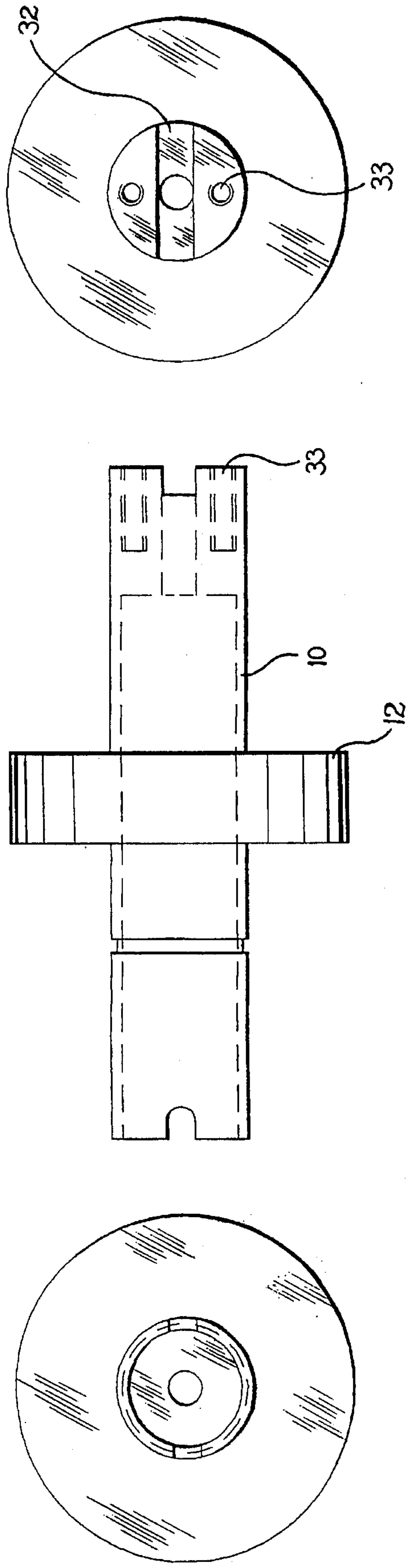
FIG. 9 shows a sleeve with a drive gear.

"The crown 1 is provided with a female recess portions (see FIG. 8) adapted to be engaged in the rough adjustment position with the corresponding male portion 31 of lock 20 (see FIG. 7). The sleeve 10 is provided with a recess 32 (see FIG. 9) which is adapted to be engaged with the male portion 31 of lock 20 fixed on the sleeve 10. As the result, in the rough adjustment position, hand wheel 2 is adapted to be locked to the sleeve 10 by means of female recess portions of crown 1 cooperating with the male portion 31 of lock 20. " The crown 1 is fixed to the hand wheel 2 by means of cap screws 11, and the lock 20 is fixed to the sleeve 10 by means of screws 21 inserted into corresponding bore portion 33. To minimize friction between hand wheel 2 and sleeve 10 it is provided a bushing 4. Similar bushings 6 and 13 are provided on the pin shaft 3 and sleeve 10 respectively to minimize friction between planet gear 7 and fixed gear 14. A bias means or spring 22 is mounted on the front portion of sleeve 10 between drive gear 12 and hand wheel 2 and is adapted to return said hand wheel 2 into normal or rough adjustment mode. As it shown on FIG. 2 the gear reducer attachment is mounted on the frame of printing press by means of stud 26, spring pin 27 and set screw 25 inserted in the stud 26.

One of the most important features of the invention is the fact that drive gear 12 has a number of teeth different from the number of teeth of the fixed gear 14. In the preferred embodiment fixed gear 14 has 35 teeth and drive gear 12 has 36 teeth. However the difference in a number of teeth may be more than one as well as the reverse situation is possible when fixed gear 14 has more teeth than drive gear 12.

In comparison with the previous arrangements, the present invention is designed to be installed to the press by means of only one screw to be removed to disengage all the assembly. In this case a spring pin 27 (see FIG. 2) is inserted in the drive shaft 5 where the corresponding slot of the sleeve 10 can sit. Also a cap screw is passed through the centre of sleeve 10 to the drive shaft 5 and through the fork plate 16 to the frame of the press.

Preferably the hand wheel 2 is made of aluminum, since it is lighter than steel and tougher than "plastic and is also more durable in case the master-printer hits or drops it. For lock 20 and crown 1 steel is used since those parts are always in contact and must absorb some shocks. " It is very easy to change these two parts at low cost. All gears are made of steel due to the friction and shocks between teeth.

The cover 15 is made of steel which is safer and tougher than plastic.

Figure 3:
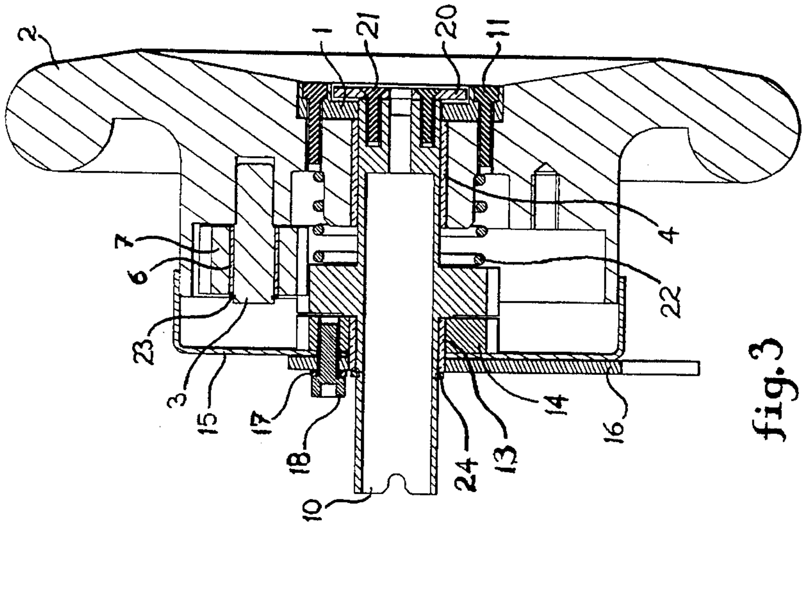
FIG. 3 shows a side cross-section view of the present invention in its rough adjustment mode.
Figure 6:
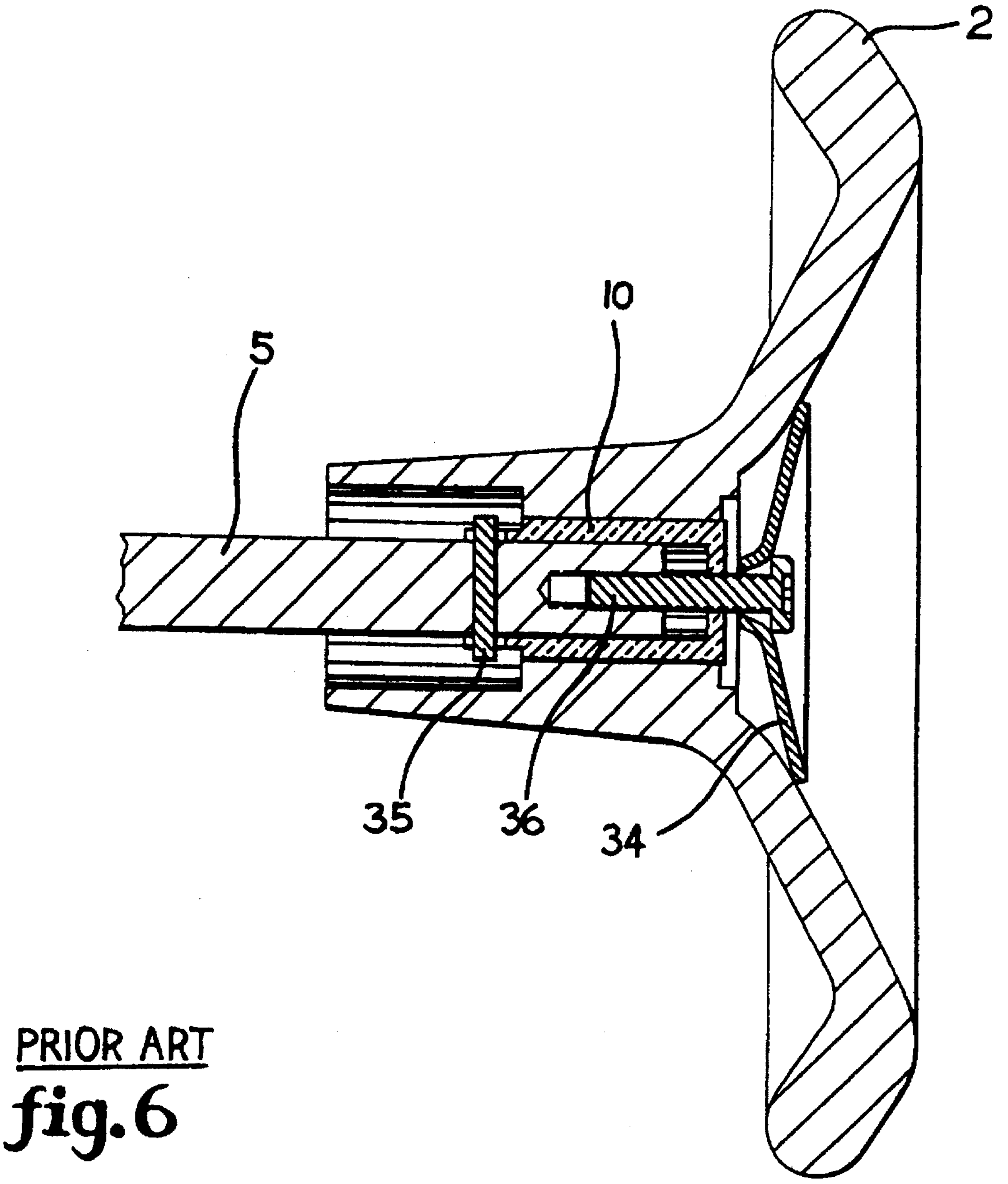
PRIOR ART fig. 6
FIG. 6 shows a side cross-section view of the Prior Art.

In operation (see FIG. 3) in the rough adjustment or macro position, the hand wheel 2 is retained by means of crown 1 engaged on the lock 20, which is in turn fixed on sleeve 10. In turn sleeve 10 is fixed on the drive shaft 5 of the press. In this position when one turns the hand wheel 2, one drives directly to the drive shaft 5. The hand wheel 2, the planet gear 7 and the drive gear 12 turn together like in the previous arrangement of FIG. 6.

Figure 4:
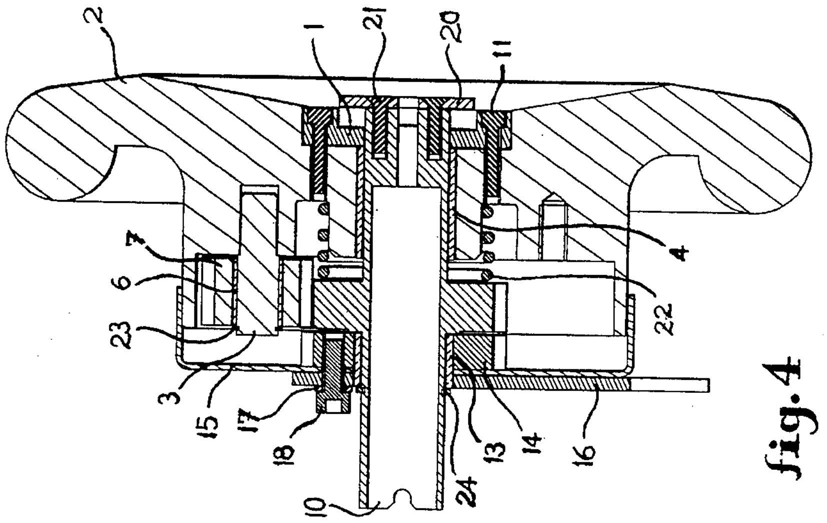
FIG. 4 shows a side cross-section view of the present invention in its neutral adjustment mode.

To transfer into a fine adjustment mode or micro mode, one has to push the hand wheel 2 forward. However to facilitate such transfer, the equipment will be brought to a neutral mode. In this position (see FIG. 4) hand wheel 2 is disengaged from lock 20 and is free, which means that it can rotate without input motion transferred to the drive shaft 5. The planet gear 7 turns on itself on its pin shaft 3 and simultaneously turns around the drive gear 12. The spring 22 is half compressed. The drive shaft 5 is free, since the hand wheel 2 is not fixedly engaged on the lock 20.

Figure 5:
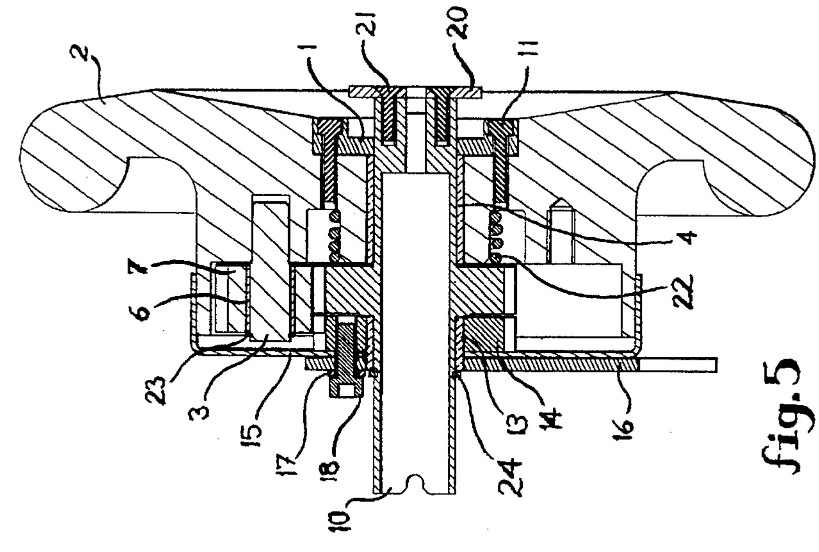
FIG. 5 shows a side cross-section view of the present invention in its fine adjustment mode.

The next step is to engage the planet gear 7 on the fixed gear 14. In view of the fact that drive gear 12 has a different number of teeth from the fixed gear 14, there is only one position where the union of planet gear 7 and gears 12 and 14 is possible, and this position is never the same. Referring to FIG. 5 to find this position it will be necessary to turn the hand wheel 2, and it will take one or less than one turn to find it. When this position is found it is necessary to push the hand wheel 2 again to facilitate the complete engagement. In this position, when the hand wheel 2 is turned, the planet gear 7 turns around the fixed gear 14 and simultaneously, because it is engaged with the drive gear 12 and it has a difference of one tooth with the fixed gear 14, the planet gear 7 inputs a rotation movement to the sleeve 10. The sleeve 10 in turn then drives the drive shaft 5 of the press. This movement is possible because of the fixed position of fixed gear 14, since it is attached to the fork plate 16, which in turn is fixed to the frame of the press by means of set of screws 25 and stud 26. In this mode the ratio between the hand wheel 2 and drive shaft 5 is 35:1, because the fixed gear 14 has 35 teeth and the drive gear 12 has 36 teeth. In this position the spring 22 is fully compressed and the fine adjustment can be made. To return to rough adjustment or macro mode, one simply has to release the hand wheel 2. The spring 22 will disengage the planet gear 7 from the fixed gear 14 and push the hand wheel 2 in the macro position. Also the hand wheel 2 has to be turned on a quarter turn to engage it with the lock 20.

The present invention possesses a number of the important advantages if compared with previous systems. It is adaptable to different models of offset presses. It is very compact and strong and may be manipulated with one hand. The hand wheel returns automatically to a rough adjustment mode and provides a reverse movement, since turning wheel to the right makes the drive shaft turn right. Different ratios are possible by modifying the number of teeth of fixed gear and drive gear. In the previous arrangement, the hand wheel 2 did not offer any ratio since it has a direct action on the drive shaft. Considering the fact that the press has a permanent ratio between the drive shaft and the back cylinder (normally this ratio is 6:1) it makes it very difficult for master-printer to adjust a fine mode. In this case master-printer relies completely on his lack and some time may spend a substantial amount of time to succeed.

The present invention offers more accuracy, as it multiplies the previous ratio of 6:1 by 35, which means that master-printer benefits from a ratio of 210:1 when he sets the hand wheel 2 to a fine adjustment or micro mode.

The present invention is also safer, because if the hand wheel 2 is pushed accidently, when it is in operation, the lock 20 become disengaged and the hand wheel 2 is freed. Also, all mechanical parts are protected by cover 15, and with a presence of the spring 22 hand wheel 2 cannot stay in the micro position, which prevents damage to the press when starting it. Preferably, but not necessarily the present invention is used with printing equipment, particularly in small offset presses with one or two colour traits. It is intended to replace the previously used hand wheel of FIG. 6 installed directly on the drive shaft 5 by means of screw 36. Hand wheel of FIG. 6 also comprises a shoulder 35 located on shaft 5 and a lock washer 34 located on hand wheel.

However it must be emphasized that the present invention can be used in any field where reduced speed or more precision in mechanical adjustment are required, such as a speed reducer in a gear box. The major areas suggested are: aerospace, automotive, machine tools, medical, paper making, valves, antennas, farm equipment, material handling (chain hoist), robotics, winches, etc. Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

What is claimed is:

1. Gear reducer adapted to provide fine mechanical adjustment or speed reducing in a gearbox comprising in combination:

- a hand wheel means adapted to provide rough and fine adjustment modes, said hand wheel means being mounted on a sleeve adapted to be engaged with a drive shaft of said gearbox,
- a drive gear mounted on said sleeve and adapted to turn with said sleeve;
- a planet wheel gear mounted on a pin shaft extending parallel to said sleeve, said hand wheel means and said planet wheel gear are adapted to move axially;
- a fixed gear mounted co-axially with said drive gear, said fixed gear being non-rotatably secured in its position to be fixed relative to said drive shaft, wherein the number of teeth of said fixed gear differs from the number of teeth of said drive gear;
- wherein in said rough adjustment mode said drive shaft is activated by means of said hand wheel being fixedly retained in said sleeve, and
- wherein in said free adjustment mode said drive shaft being activated by means of said planet wheel gear intermeshing simultaneously with said drive gear and said fixed gear.

2. A gear reducer according to claim 1, wherein said fine adjustment mode is provided by means of axial forward movement of said hand wheel means and said planet wheel gear towards said fixed gear.

3. A gear reducer according to claim 2, wherein said reducer further comprising a lock means adapted to retain said hand wheel fixed to said sleeve, wherein in said rough adjustment mode said hand wheel is being retained by said lock means, and wherein in said fine adjustment mode said hand wheel is being disengaged from said lock means.

4. Gear reducer according to claim 1, wherein the difference between the number of teeth of said drive gear and said fixed gear is at least one tooth.

5. Gear reducer according to claim 4, wherein said fixed gear has one tooth more than said drive gear.

6. Gear reducer according to claim 4, wherein said drive gear has one tooth more than said fixed gear.

7. Gear reducer according to claim 1, wherein said reducer having a neutral adjustment mode provided to facilitate a successful transfer of said hand wheel from said rough adjustment position into said fine adjustment position.

8. Gear reducer according to claim 7, wherein in said neutral position said hand wheel is moved axially forwardly towards said fixed gear and becomes completely disengaged from said lock means without activating said drive shaft.

9. Gear reducer according to claim 1, wherein said reducer further comprising a bias means mounted on said sleeve, said bias means being provided to return said hand wheel from said fine adjustment mode into said rough adjustment mode.

10. Gear reducer according to claim 1, wherein said sleeve and said drive gear comprises a unitary element.

11. Gear reducer for printing machine comprising:

a hand wheel adapted to provide rough and fine adjustment modes, said hand wheel being mounted on a sleeve adapted to be engaged with a drive shaft of said printing machine;

a planet wheel mounted on said hand wheel by means of a pin shaft extending parallel to said sleeve, a drive gear mounted on said sleeve, said drive gear adapted to turn together with said sleeve;

a lock means adapted to retain said hand wheel locked on said sleeve, a fixed gear mounted on a frame of said printing machine, said fixed gear being coaxial with said drive gear, said fixed gear having a number of teeth which differs from the number of teeth of said drive gear;

said hand wheel is adapted to move together with said planet wheel gear axially forwardly towards said fixed gear;

wherein in said rough adjustment mode said hand wheel is being retained by said lock means engaged on said sleeve, said hand wheel is adapted to activate said drive shaft by means of said sleeve, and wherein in said fine adjustment mode said hand wheel being disengaged from said lock means by means of axial forward movement towards said fixed gear, and said planet wheel gear being simultaneously meshed with said drive gear and said fixed gear, said fine adjustment is provided by means of input of rotation movement transferred from said planet wheel gear meshed with said fixed gear.

12. Gear reducer according to claim 11, wherein the difference between the number of teeth of said drive gear and said fixed gear is at least one tooth.

13. Gear reducer according to claim 12, wherein said fixed gear has one tooth more than said drive gear.

14. Gear reducer according to claim 12, wherein said drive gear has one tooth more than said fixed gear.

15. Gear reducer according to claim 11, wherein said reducer having a neutral adjustment mode provided to facilitate a successful transfer of said hand wheel from said rough adjustment position into said fine adjustment position.

16. Gear reducer according to claim 15, wherein in said neutral position said hand wheel is moved axially forwardly towards said fixed gear and becomes completely disengaged from said lock means without activating said drive shaft.

17. Gear reducer according to claim 11, wherein said reducer further comprising a bias means mounted on said sleeve, said bias means being provided to return said hand wheel from said fine adjustment mode into said rough adjustment mode.

18. Gear reducer according to claim 11, wherein said sleeve and said drive gear comprises a unitary element.

19. In a printing press having a frame member and a drive shaft connected to an impression cylinder, a gear reducer comprising in combination:

a hand wheel adapted to provide rough and fine adjustment modes, said hand wheel being mounted on a sleeve adapted to be engaged with a drive shaft of said printing machine;

a planet wheel mounted on said hand wheel by means of a pin shaft extending parallel to said sleeve, a drive gear mounted on said sleeve, said drive gear adapted to turn together with said sleeve;

a lock means adapted to retain said hand wheel locked on said sleeve, a fixed gear mounted on a frame of said printing machine, said fixed gear being coaxial with said drive gear, said fixed gear having a number of teeth which differs from the number of teeth of said drive gear;

said hand wheel is adapted to move together with said planet wheel gear axially forwardly towards said fixed gear;

wherein in said rough adjustment mode said hand wheel is being retained by said lock means engaged on said sleeve, said hand wheel is adapted to activate said drive shall by means of said sleeve, and wherein in said fine adjustment mode said hand wheel being disengaged from said lock means by means of axial forward movement towards said fixed gear, and said planet wheel gear being simultaneously meshed with said drive gear and said fixed gear, said free adjustment is provided by means of input of rotation movement transferred from said planet wheel gear meshed with said fixed gear.

20. Gear reducer according to claim 19, wherein the difference between the number of teeth of said drive gear and said fixed gear is at least one tooth.

21. Gear reducer according to claim 19, wherein said fixed gear has one tooth more than said drive gear.

22. Gear reducer according to claim 19, wherein said reducer having a neutral adjustment mode provided to facilitate a successful transfer of said hand wheel from said rough adjustment position into said fine adjustment position.

23. Gear reducer according to claim 22, wherein in said neutral position said hand wheel is moved axially forwardly towards said fixed gear and becomes completely disengaged from said lock means without activating said drive shaft.

24. Gear reducer according to claim 19, wherein said reducer further comprising a bias means mounted on said sleeve, said bias means being provided to return said hand wheel from said fine adjustment mode into said rough adjustment mode.

25. Gear reducer according to claim 19 wherein said sleeve and said drive gear comprises a unitary element.

* * * * *